(12) United States Patent
Saarela

(10) Patent No.: US 10,451,181 B2
(45) Date of Patent: Oct. 22, 2019

(54) SELF-ADJUSTING CABLE END FITTING DEVICE

(71) Applicant: VOLVO CAR CORPORATION, Gothenburg (SE)

(72) Inventor: Tommi Saarela, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 854 days.

(21) Appl. No.: 14/532,529

(22) Filed: Nov. 4, 2014

(65) Prior Publication Data

US 2015/0135885 A1     May 21, 2015

(30) Foreign Application Priority Data

Nov. 15, 2013    (EP) ..................................... 13193092

(51) Int. Cl.
| | |
|---|---|
| *F16C 1/14* | (2006.01) |
| *F16H 61/36* | (2006.01) |
| *F16C 1/22* | (2006.01) |

(52) U.S. Cl.
CPC ............... *F16H 61/36* (2013.01); *F16C 1/14* (2013.01); *F16C 1/145* (2013.01); *F16C 1/22* (2013.01);
(Continued)

(58) Field of Classification Search
CPC .................................... F16H 61/36; F16C 1/14
See application file for complete search history.

(56) References Cited

U.S. PATENT DOCUMENTS

| 4,815,883 A | * | 3/1989 | Takke | ........................ | F16C 1/14 |
| | | | | | 403/141 |
| 5,394,770 A | * | 3/1995 | Boike | ........................ | F16C 1/14 |
| | | | | | 403/104 |

(Continued)

FOREIGN PATENT DOCUMENTS

| CA | 2257733 A1 | 7/1999 | | |
| DE | 102006039761 B3 | * | 2/2008 | .............. F16B 21/09 |

(Continued)

OTHER PUBLICATIONS

Extended European Search Report dated Feb. 28, 2014, Application No. 13193092.7-1751, Applicant Volvo Car Corporation, 4 Pages.

(Continued)

*Primary Examiner* — Vicky A Johnson
(74) *Attorney, Agent, or Firm* — Brooks Kushman P.C.

(57) ABSTRACT

An end fitting device is provided for axially adjustable connection of an end portion of a motion transmitting cable to an actuating member. The end fitting device comprises a housing having a receiving space adapted for receiving the end portion of the cable via a cable entry; a connector member comprising a ball pin receiver adapted for engaging a ball pin, and having an engaged state and a disengaged state; a locking element adapted for locking the axial position of the cable end portion relative to the housing and being movable between a non-locking position and a locking position; and a force bridge connected to the locking element such that the locking element is displaced from its non-locking position to its locking position when an engaging force is applied to the end fitting device in order to bring the connector member into its engaged state.

20 Claims, 5 Drawing Sheets

(52) U.S. Cl.
CPC ......... *F16C 1/223* (2013.01); *Y10T 74/20438* (2015.01); *Y10T 74/20462* (2015.01)

(56) References Cited

U.S. PATENT DOCUMENTS

| | | | | |
|---|---|---|---|---|
| 5,598,743 | A | * 2/1997 | Yasuda | F16C 1/14 403/11 |
| 5,709,132 | A | 1/1998 | Irish et al. | |
| 6,109,132 | A | * 8/2000 | Frye | F16C 1/14 74/501.5 R |
| 2007/0157757 | A1 | * 7/2007 | Trevino | F16H 59/02 74/519 |
| 2010/0251847 | A1 | * 10/2010 | Gordy | F16C 1/14 74/502.6 |

FOREIGN PATENT DOCUMENTS

| | | |
|---|---|---|
| EP | 0821168 A2 | 1/1998 |
| EP | 0927830 A1 | 7/1999 |
| WO | 9951887 A1 | 10/1999 |

OTHER PUBLICATIONS

Chinese Patent Office, First Search Report for related Application No. CN2014106386617, dated Apr. 4, 2018, 2 pages.

Chinese Patent Office, First Office Action for related Application No. CN2014106386617, dated Apr. 16, 2018, 11 pages (including English language translation).

The State Intellectual Property Office of People's Republic of China, Third Office Action for related Application No. CN201410638661,7, dated Mar. 26, 2019, 8 pages (including English language translation).

* cited by examiner

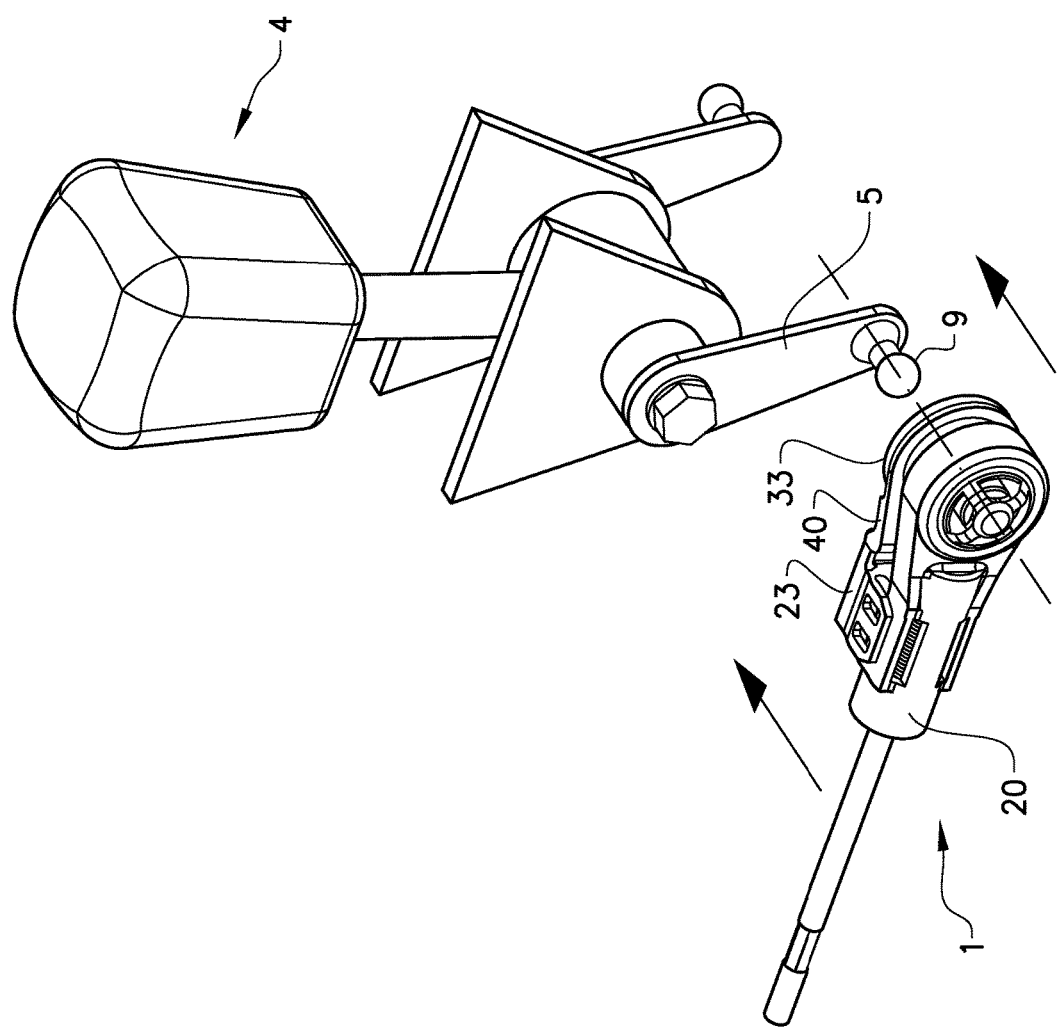

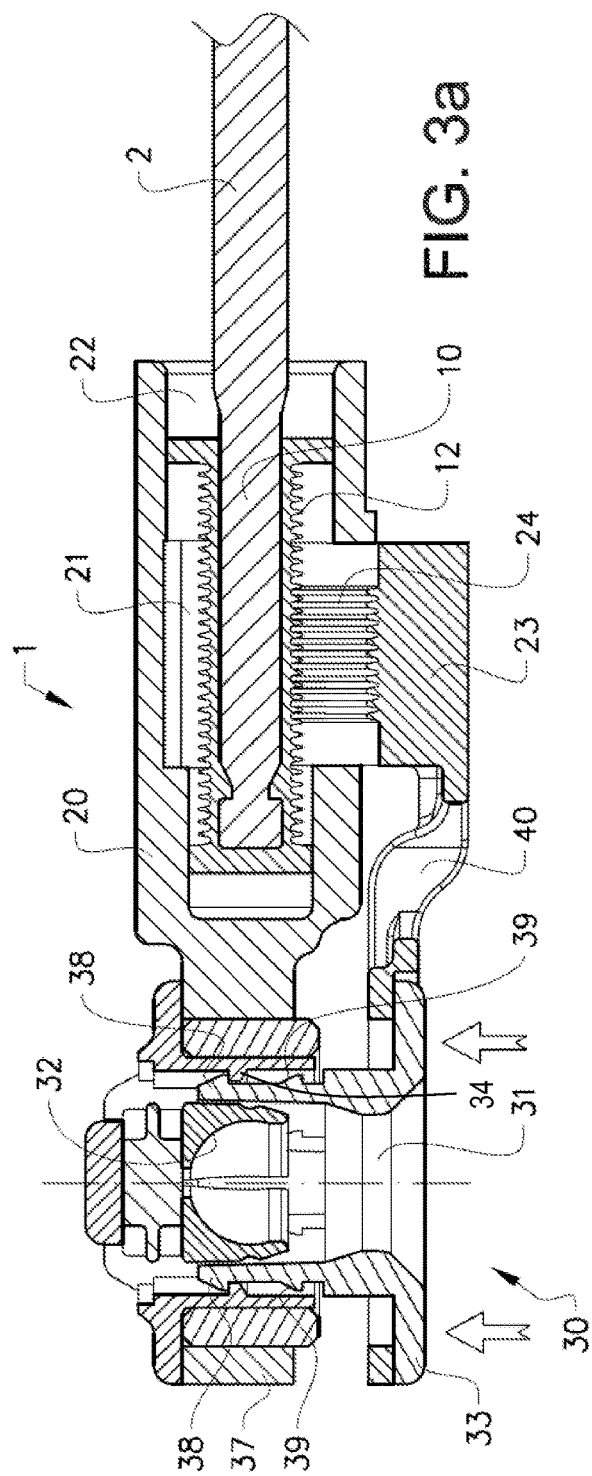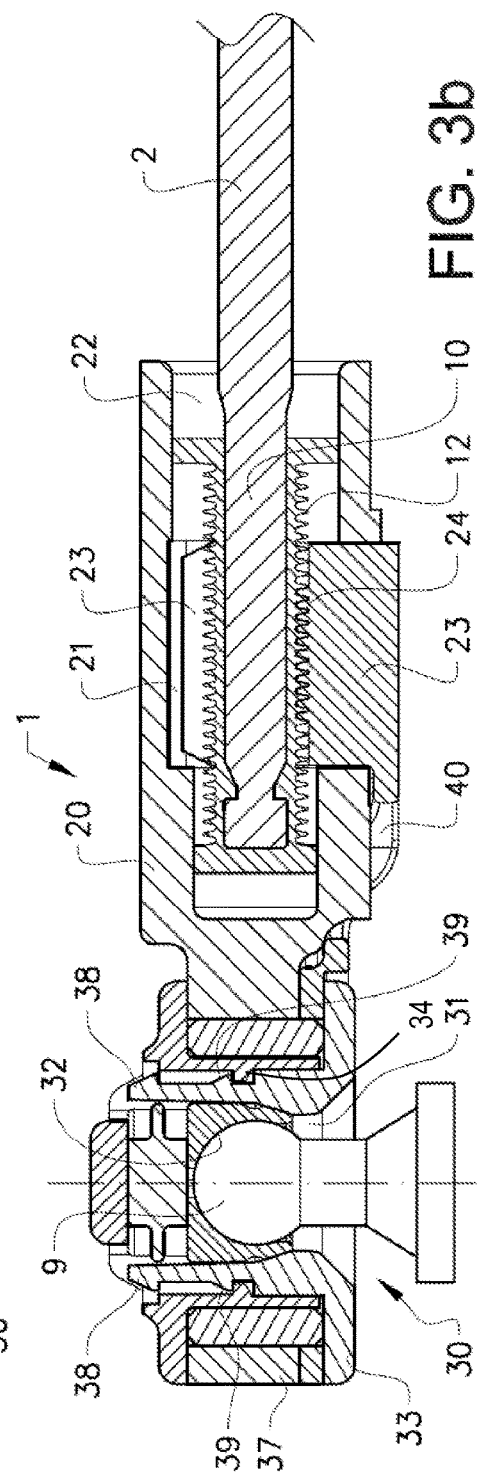

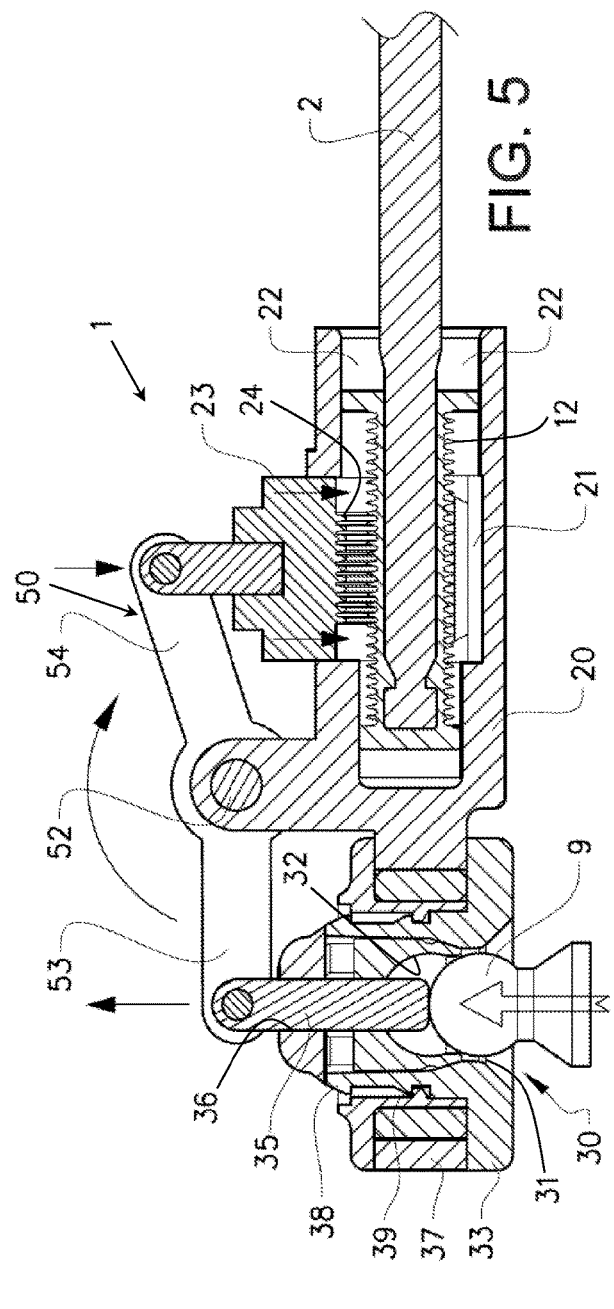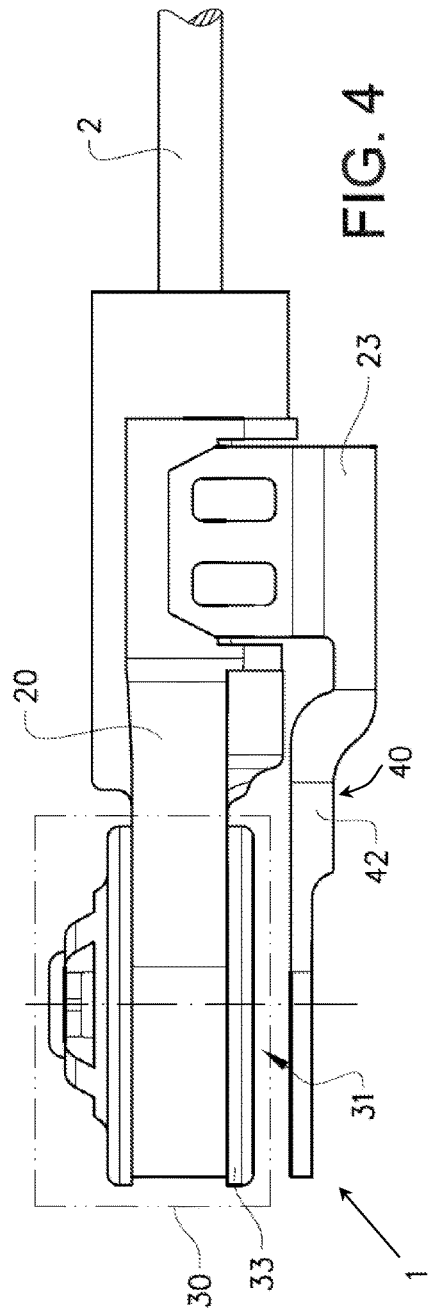

SELF-ADJUSTING CABLE END FITTING DEVICE

CROSS-REFERENCE TO RELATED APPLICATIONS

This application claims foreign priority benefits under 35 U.S.C. § 119(a)-(d) to European patent application number EP 13193092.7, filed Nov. 15, 2013, which is incorporated by reference in its entirety.

TECHNICAL FIELD

This disclosure relates generally to cable end fittings and more particularly to an end fitting device for axially adjustable connection of an end portion of a motion transmitting cable to an actuating member. The disclosure also relates to a gear shift assembly comprising a cable end fitting device. The disclosure is particularly advantageous in the field of manual transmission in motor vehicle applications.

BACKGROUND

In a motor vehicle with a manual transmission, the movements of the gear shift lever are commonly transmitted to the gear box via a cable. In order to facilitate the installation of the cable assembly in the motor vehicle, it is important that some means are provided to adjust the length of the cable in order to provide precise control of the gear box in each installation. A known solution is to use a cable end fitting which comprises means for attachment to a ball pin on the gear shift lever as well as a locking mechanism for locking the cable length, as disclosed for example in U.S. Pat. Nos. 5,394,770 and 5,598,743. An assembler manually attaches the cable end fitting to the ball pin in question, and then actuates the locking mechanism, for example by depressing a button. These cable end fittings provide adequate attachment as well as adjusted cable length as long as properly installed. However, there is always a risk of the assembler not actuating the locking mechanism, which results in too much play in the cable and hence in a non-operable gear box.

There is thus a need for an improved cable end fitting device that at least partly removes the above mentioned disadvantage.

SUMMARY

An object of the present disclosure is to provide a cable end fitting device where the previously mentioned problem is at least partly avoided.

The disclosure discloses an end fitting device for axially adjustable connection of an end portion of a motion transmitting cable to an actuating member. An example of an actuating member is a gear shift lever or a lever arm provided on a gear shift lever. An example of a motion transmitting cable is a shift cable. The end fitting device comprises:

A housing having a receiving space adapted for receiving the end portion of the cable via a cable entry.

A connector member comprising a ball pin entrance opening and a ball pin receiver adapted for engaging with a ball pin. The connector member is defined to be in an engaged state when the ball pin receiver is engaged with a ball pin and in a disengaged state when the ball pin receiver is not engaged with a ball pin.

A locking element adapted for locking the axial position of the cable end portion relative to the housing. The locking element is movable between a non-locking position and a locking position in which the locking element locks the axial position of the cable end portion.

Said ball pin is provided on the actuating member. The end fitting device is characterized in that it is provided with a force bridge. The force bridge is connected such to said locking element that said locking element is displaced from its non-locking position to its locking position when an engaging force is applied to the end fitting device in order to bring the connector member into its engaged state, whereby the engaging force partially is transferred to said locking element. In order to attach the end fitting device to the actuating member, an assembler presses the ball pin entrance opening of the connector member towards the ball pin in order to force the ball pin to enter the connector member and to engage with the ball pin receiver. The ball pin receiver defines a spherical cavity within the connector member. The ball pin receiver being engaged with a ball pin means that the head, i.e., the spherical part, of the ball pin is contained within the spherical cavity defined by the ball pin receiver. An engaging force intended to bring the connector member into its engaged state is typically applied at or close to the connector member, since the engagement with the ball pin takes place in the connector member. By transferring a part of this engaging force to act upon the locking element, the locking element is actuated. This results in the locking element being brought into its locking position by the mere act of mounting the end fitting device to the ball pin. Consequently, the risk of an assembler forgetting or missing out to actuate the locking element is eliminated. An advantage of the end fitting device is thus that the cable length always gets locked. In the case of a gear shift assembly, an overlooked actuation of the locking element results in too much play in the shift cable and hence in a non-operable gear box. Such non-operability is usually discovered in testing the vehicle before leaving the manufacturing factory or repair shop, but nonetheless causes time delays in the production as the mistake has to be corrected. An advantage of the end fitting device is thus that time can be saved in a manufacturing factory or repair shop, as no forgotten or missed out actuations of locking elements have to be corrected. A further advantage is that the mounting time is reduced since the connecting of the end fitting device to a ball pin and the actuation of the locking element is performed in the same step, i.e. the number of assembly steps is reduced.

The above-mentioned force bridge may be accomplished in different ways.

In one example of the disclosure, the force bridge interconnects said locking element and said connector member such that said engaging force partially is transferred to the locking element.

The force bridge may be adapted to interact either with said ball pin or a body upon which the ball pin is arranged. Said body is typically an integrated part, for example a lever arm, of the aforementioned actuating member to which a cable is to be adjustably connected. In order to attach the end fitting device to the actuating member, an assembler presses the ball pin entrance opening of the connector member towards the ball pin in order to force the ball pin into engagement with the ball pin receiver. The force bridge is arranged to mechanically interact with either said ball pin or said body as the assembler forces the ball pin into engagement with the ball pin receiver. The engaging force, i.e., the pressing, exerted by the assembler is partly transferred to the force bridge as a reaction force actuated by the ball pin or the body upon the force bridge. The force bridge transfers the force to the locking element which is displaced into its locking position by said force.

The locking element may be arranged on the same side of the end fitting device as the ball pin entrance opening. Such an arrangement allows for a simple, rigid design of the force bridge as the force of reaction exerted by the ball pin or the body when the assembler presses the ball pin entrance opening towards the ball pin is already in an appropriate direction for pressing the locking element into its locking position.

In one aspect of the disclosure, the connector member may further comprise a collar member surrounding the ball pin entrance opening. The collar member is adapted to be arranged in a first position when the connector member is in its disengaged state and in a second position when the connector member is in its engaged state. The second position is closer to the ball pin receiver than the first position. As the ball pin is forced to enter the ball pin receiver by the engaging force applied by the assembler, the ball pin or the body upon which the ball pin is arranged abuts against the collar member and pushes the collar member into its second position.

The force bridge may be constituted by a rigid projecting portion of the collar member. Said projecting portion is either abutting against, is integrated with, or is fixed to the locking element such that a translational movement of the collar member towards the ball pin entrance opening is transferred to the locking element by said projecting portion. Hence, the translational movement of the collar member into its second position as the ball pin engages with the ball pin receiver is transferred to the locking element where the translational movement results in the locking element being brought into its locked position.

An advantage of having the force bridge integrated with the collar member is that the volume of the end fitting device is kept down. The available space for components in modern vehicles is extremely limited, and every cubic centimeter— or even fraction of a cubic centimeter—that can be saved is a gain. A collar member, also known as a damper retainer, is commonly used in prior art end fitting devices in order to keep a vibration damper in place in the end fitting device. Without a vibration damper in the end fitting device, vibrations present in the gear box will propagate via the cable into the gear shift lever where the vibrations cause wear as well as nuisance to the operator of the gear shift lever. This end fitting device according to the disclosure keeps the advantageous vibration damper of the prior art devices, but utilizes the collar member not only for retaining the vibration damper but also for bringing the locking element into its locking position. Once the connector member is engaged, the collar member is arranged in its second position where it requires no more space than in prior art end fitting devices.

In one aspect of the disclosure, the force bridge is constituted by a lever pivoting around a pivot point, wherein a second end portion of said lever is adapted to interact with the locking element. A first lever end portion of the lever is impacted as the connector member enters its engaged state. Due to the nature of levers pivoting around a pivot point, any impact on the first end portion will be reflected at the second end portion. Also, depending on the position of the pivot point relative to the ends of the levers, the force and displacement transferred to the second end portion may be increased or reduced respectively (as well understood by any person skilled in the art of mechanics, since torque is the product of distance to the pivot point and force). An advantage of using a lever as force bridge is therefore that the force required to be applied by the assembler may be reduced.

In one aspect of the disclosure, the connector member comprises a movable pin. The pin extends into the ball pin receiver when the connector member is in its disengaged state. As the connector member is brought into its engaged state, the pin is pushed out from the ball pin receiver by the entering ball pin such that the movable pin exerts a force on a first end portion of the lever as the connector member is brought into its engaged state.

The second end portion interacts with the locking element by pushing it into its locking position. Alternatively, the second end portion may interact with the locking element by pulling it into its locking position. Pushing or pulling depends on the layout of the end fitting device, e.g., how the lever and the locking element are arranged.

In one aspect of the disclosure, the locking element is arranged on the opposite side of the end fitting device relative to the ball pin entrance opening. Such an arrangement enables other designs of e.g., the force bridge and the locking element than an arrangement with locking element and ball pin entrance opening on the same side of the end fitting device.

This disclosure further relates to a gear shift assembly comprising a gearbox and a gear shift lever interconnected by a shift cable adapted for transmitting commands from the gear shift lever to the gearbox. A first end portion of said shift cable is attached to a first ball pin arranged on a first lever arm of the gear shift lever and a second end portion of said shift cable is attached to a second ball pin arranged on a second lever arm of said gearbox. The gear shift assembly is characterized in that at least one of the ends portions of the shift cable is provided with an end fitting device as described in this disclosure. Such a gear shift assembly benefits from the advantages of the end fitting device, said advantages being described previously.

BRIEF DESCRIPTION OF THE DRAWINGS

In the detailed description of the disclosure given below reference is made to the following figures, in which:

FIGS. 2a and 2b show perspective views of a first embodiment of the end fitting device;

FIGS. 3a and 3b show section views of the first embodiment of the end fitting device wherein the connector member is in a engaged and disengaged state respectively, FIG. 4 shows a side view of a second embodiment of the end fitting device; and FIG. 5 shows a section view of a third embodiment of the end fitting device.

DETAILED DESCRIPTION

Figure 1:
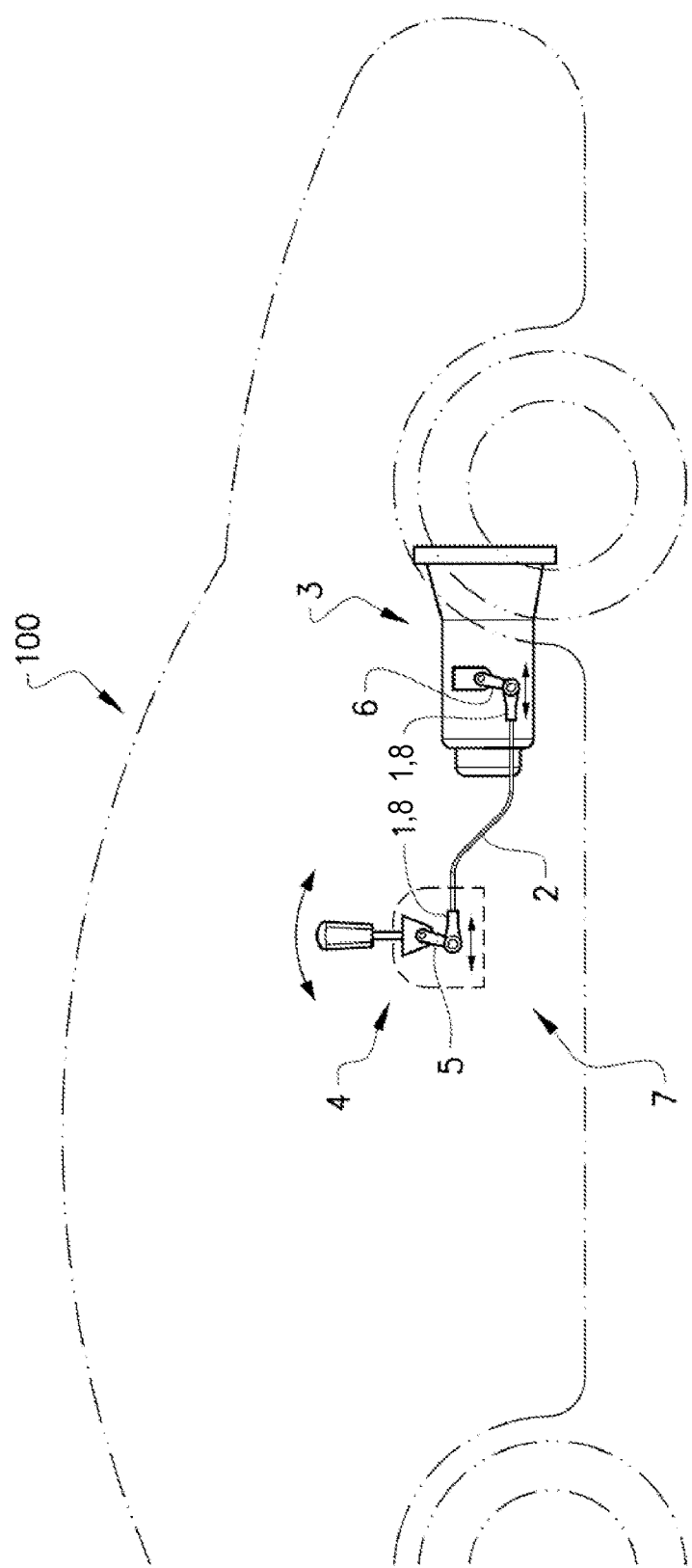
FIG. 1 shows a schematic overview of a gear shift assembly comprising an example of an end fitting device according to the disclosure.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Various aspects of the disclosure will hereinafter be described in conjunction with the appended drawings to illustrate but not to limit the disclosure. In the drawings, three embodiments of the disclosure are shown and described, simply by way of illustration of some modes of carrying out the disclosure. In the drawings, like designations denote like elements. Variations of the different aspects are not restricted to the specifically shown embodiment, but are applicable on other variations of the disclosure.

FIG. 1 shows a schematic overview of a gear shift assembly 7 comprising an example of an end fitting device 1 according to the disclosure. As indicated in FIG. 1, such a gear shift assembly 7 is found for example in a vehicle 100 such as a car. But the gear shift assembly 7 could also be found in other applications. The gear shift assembly 7 comprises a gearbox 3 and a gear shift lever 4 linked by a shift cable 2. One end of the shift cable 2 is connected to a first lever arm 5 of the gear shift lever 4 via an end fitting device 8 and the other end of the shift cable 2 is connected to a second lever arm 6 of the gearbox 3 via an end fitting device 8. In order for the movements of the first lever arm 5 of the gear shift lever 4 to be properly transmitted to the second lever arm 6 of the gearbox 3, it is important that the shift cable 2 does not have any play in the direction of the transmitted motion. For this reason, at least one of the end fitting devices 8 is an adjustable end fitting device 1 which allows for adjustments of the cable length. The result of providing the shift cable 2 with at least one adjustable end fitting device 1 is that the length of the shift cable 2 can be adapted for each specific installation and excess play in the length of the shift cable 2 can readily be removed. The adjustable end fitting device 1 may be provided at either end of the shift cable, either at the end at the gear shift lever 4 or at the end at the gear box 3. Alternatively, an adjustable end fitting device is provided at both cable ends.

Figure 2B:
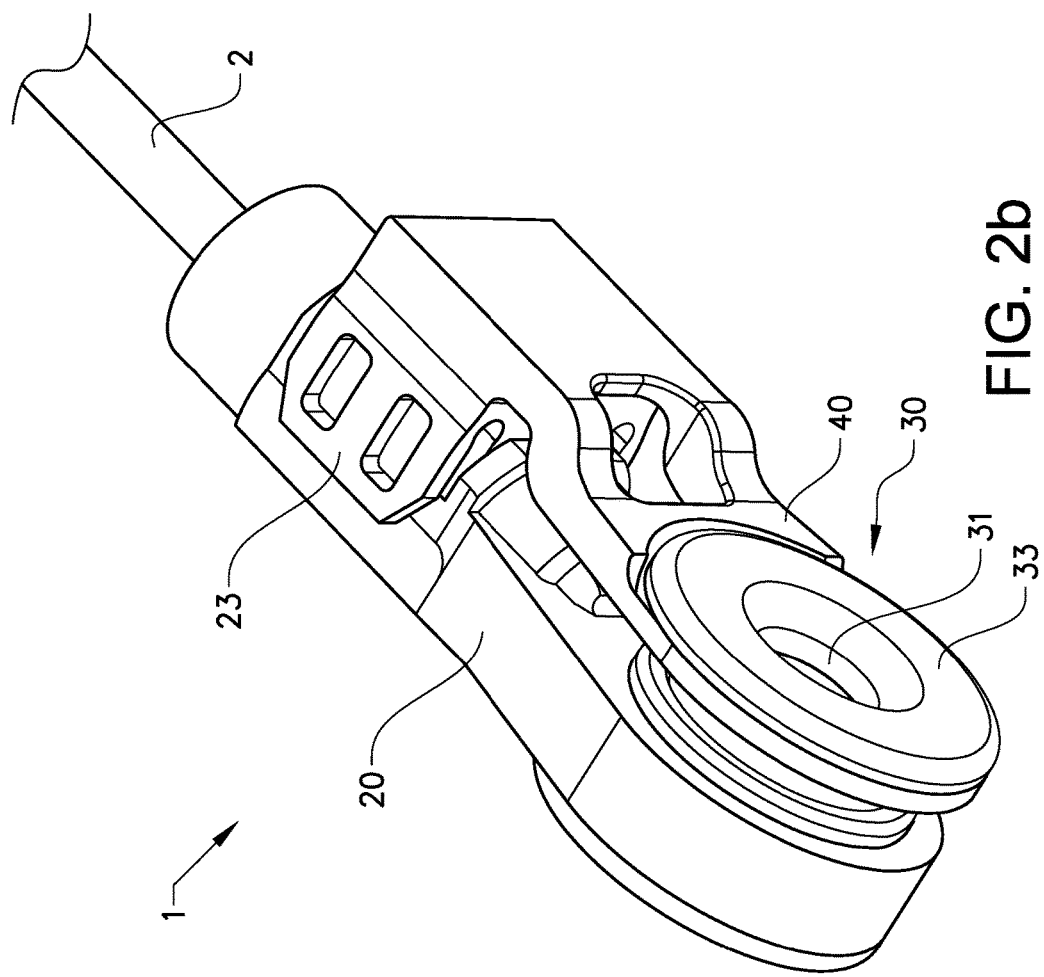

FIGS. 2a and 2b show a first embodiment of the end fitting device 1 being mounted to an actuating member, in this example a gear shift lever 4, and a perspective view of the first embodiment of the end fitting device. The end fitting device 1 comprises a housing 20, a locking element 23 for locking the axial position of a cable 2 inserted into the end fitting device 1, and a connector member 30 adapted for connecting to a ball pin 9, which ball pin is inserted into the end fitting device 1 via a ball pin entrance opening 31 in the connector member 30. A collar member 33 encircles the ball pin entrance opening 31. When the connector member 30 is disengaged, i.e. not connected to a ball pin, the collar member extends a distance outside of the housing 20. The collar member 33 is further provided with a rigid projecting portion 40 which abuts against or is connected to the locking element 23. When mounting the end fitting device 1 to a gear shift lever 4, the end fitting device 1 is oriented such that its ball pin entrance opening 31 faces a ball pin 9 integrated with a first lever arm 5 of the gear shift lever 4. An assembler presses the end fitting device 1 towards the first lever arm 5 in order to insert the ball pin 9 into the ball pin entrance opening 31. As the end fitting device 1 starts to receive the ball pin 9, the collar member 33 abuts against the ball pin 9 and/or the first lever arm 5. In response to the engaging force applied by the assembler on the end fitting device 1 in a direction towards the first lever arm 5, the ball pin 9 and/or the first lever arm 5 exerts a reaction force on the collar member 33. The reaction force displaces the collar member 33 towards the housing 20. The translational movement of the collar member 33 towards the housing 20 is shared by its rigid projecting portion 40 which presses down on the locking element 23 such that the locking element 23 is brought into its locking position and hence fixes the length of the cable 2. Thus, the locking of the locking element 23 is obtained as a side effect to engaging the connector member 30 with a ball pin 9.

FIGS. 3a and 3b show section views of the first embodiment of the end fitting device 1 wherein the connector member 30 is in a disengaged state and engaged state respectively. The housing 20 comprises a receiving space 21 adapted for receiving the end portion 10 of a cable 2. The end portion 10 is inserted via the cable entry 22. The cable entry 22 is an opening in the housing adapted for the insertion of a cable end portion 10. The cable end portion 10 is provided with a set of teeth 12 adapted for engaging with corresponding second set of teeth 24 in the locking element 23. In FIG. 3a, the locking element 23 is in a non-locking position and the two sets of teeth 12, 24 are not engaged. Note however that other means than teeth could be used in the locking mechanism, for example frictional means.

FIGS. 3a and 3b also reveal the interiors of the connector member 30. The interiors of the connector member 30 comprises a ball pin receiver 32 adapted to enclose and hold a ball pin and at least one protrusion 34 adapted to keep the collar member 33 in a predefined position. The at least one protrusion 34 interacts with one of two different snap elements 38, 39 provided on the collar member 33. When the protrusion 34 interacts with the first snap element 38, as in FIG. 3a, the collar member 33 is defined to be in a first position. Here, the collar member 33 extends a distance from the housing 20 of the end fitting device 1. The collar member 33 is adapted to be arranged and held in its first position when the connector member 30 is in its disengaged state, i.e., is not engaged with a ball pin. The advantage of this arrangement is that the end fitting device 1 may be delivered in one piece, without any securing sprint that has to be removed, and that the collar member 30 cannot disappear from the end fitting device 1. Alternatively, the first snap element 38 could be provided in the locking element 23 instead. In such case, the locking element should be provided with a protrusion adapted for interaction with the first snap element.

As the connector member 30 is brought into engagement with a ball pin, a force will be exerted on the collar member as explained in connection to FIGS. 2a and 2b. This force is large enough to force the first snap element 38 past the protrusion 34, such that collar member 33 moves towards the ball pin receiver 32 until the protrusion 34 instead is brought into interaction with the second snap element 39. When the protrusion 34 interacts with the second snap element 39, as in FIG. 3b, the collar member is defined to be in its second position. In its second position, the collar member 33 is snug against the housing 20, firmly holding the vibration damper 37 provided in the connector member 30 in place. The collar member 33 is adapted to be arranged in its second position when the connector member 30 is in its engaged state, i.e., is engaged with a ball pin. The translational movement of the collar member 33 from its first to its second position is transferred to the locking element 23 via the rigid projecting portion 40 of the collar member 33. Consequently, when the collar member 33 is brought into its second position, the locking element 23 is simultaneously brought into a locking position where its set of teeth 12 engages with the set of teeth 24 on the end portion 10 of the cable 2, as shown in FIG. 3b. Hence, the length of the cable 2 is fixed.

In the embodiment of the end fitting device 1 shown in FIGS. 3a and 3b, the connector member 30 and the cable entry 22 are provided in opposite ends of the end fitting device 1, along the axial direction of the cable end portion 10. However, it would also be possible to realize an end fitting device 1 by providing the connector member 30 displaced from the axial direction of the cable end 2, for example at an angle, for example 90 degrees, to locking element 23.

FIG. 4 shows a side view of a second embodiment of the end fitting device 1 wherein the connector member 30 is in its disengaged state. In this embodiment, the collar member 33 is non-mobile and is not involved in the locking of the cable end portion 10. Instead, the force bridge 40 is constituted by a rigid extension 42 of the locking element 23. The rigid extension 42 is adapted to interact with a body upon which a ball pin is arranged as the ball pin is inserted into the ball pin entrance opening 31. Said body may be for example a lever arm of a gear shift lever or a gear box. As an engaging force is applied upon the ball pin via the end fitting device 1 in order to bring the connector member 30 into engagement with the ball pin, the body will exert a reaction force in the opposite direction upon the extension 42 of the locking element 23, i.e., in a direction towards the housing 20. As the rigid extension 42 is an integrated part of the locking element 23 or rigidly fixed to the locking element 23, the reaction force will be transferred to the locking element 23 and bring it into its locking position. In this embodiment, first and second snap elements are arranged to interact with a protrusion provided in the locking element 23. The function of first and second snap elements interaction with a protrusion is described in connection to FIGS. 3a and 3b.

FIG. 5 shows a section view of a third embodiment of the end fitting device 1, wherein the connector member 30 is in its disengaged state. A movable pin 35 is provided in the connector member 30 and a lever 50 (e.g., force bridge) is provided pivoting around a pivot point 52. When the connector member 30 is in its disengaged state, as in FIG. 5, the pin 35 extends into the ball pin receiver 32. As a ball pin enters the connector member 30, it will push the pin 35 out from the connector member 30 through a pin opening 36 in the housing 20. The pin opening 36 is provided on the opposite side of the end fitting device 1 to the ball pin entrance opening 31. As the pin 35 exits the interior of the connector member 30 through the pin opening 36, it will exert a force on a first lever end portion 53 of said lever 50. The torque induced by said force causes the second lever end portion 54 to exert a force onto the locking element 23 which is pushed down into its locking position where its set of teeth 24 engages with the set of teeth 12 of the cable end portion 10.

As will be realized, the disclosure is capable of modification in various obvious respects, all without departing from the scope of the appended claims. Accordingly, the drawings and the description thereto are to be regarded as illustrative in nature, and not restrictive.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An end fitting device for axially adjustable connection of an end portion of a motion transmitting cable to an actuating member, the end fitting device comprising:
   a housing having a receiving space adapted for receiving the end portion of the cable via a cable entry;
   a connector member comprising a ball pin entrance opening and a ball pin receiver adapted for engaging with a ball pin, wherein an engaged state of the connector member is defined as the ball pin receiver is engaged with a ball pin and a disengaged state of the connector member is defined as the ball pin receiver is not engaged with a ball pin;
   a locking element configured to lock an axial position of the cable end portion relative to the housing, wherein the locking element is movable between a non-locking position and a locking position in which the locking element locks the axial position of the cable end portion wherein the cable end portion is immovable axially relative to the housing; and
   a force bridge connected to the locking element, the force bridge configured to displace the locking element from its non-locking position to its locking position in response to an engaging force applied to the end fitting device that brings the connector member into its engaged state, wherein the force bridge partially transfers the engaging force to the locking element, wherein the force bridge comprises a lever that is pivotable about a pivot point, and wherein an end portion of the lever is adapted to interact with the locking element.

2. The end fitting device according to claim 1 wherein the force bridge interconnects the locking element and the connector member, wherein the engaging force is partially transferred to the locking element.

3. The end fitting device according to claim 2 wherein the force bridge is adapted to interact with the ball pin or a body upon which the ball pin is arranged.

4. The end fitting device according to claim 3 wherein the locking element is arranged on a same side of the end fitting device as the ball pin entrance opening.

5. The end fitting device according to claim 3 wherein the locking element and the ball pin entrance opening are arranged on opposite sides of the end fitting device.

6. The end fitting device according to claim 1 wherein the force bridge is adapted to interact with the ball pin or a body upon which the ball pin is arranged.

7. The end fitting device according to claim 1 wherein the locking element is arranged on a same side of the end fitting device as the ball pin entrance opening.

8. The end fitting device according to claim 7 wherein the connector member further comprises a collar member surrounding the ball pin entrance opening, wherein the collar member is adapted to be arranged in a first position with the connector member is in its disengaged state and in a second position with the connector member is in its engaged state, and wherein the second position is closer to the ball pin receiver than the first position.

9. The end fitting device according to claim 8 wherein the force bridge comprises a rigid projecting portion of the collar member, wherein the projecting portion either abuts against, is integrated with, or is fixed to the locking element wherein a translational movement of the collar member towards the ball pin entrance opening is transferred to the locking element by the projecting portion.

10. The end fitting device according to claim 1 wherein the locking element and the ball pin entrance opening are arranged on opposite sides of the end fitting device.

11. The end fitting device according to claim 1 wherein the connector member comprises a movable pin that extends into the ball pin receiver when the connector member is in its disengaged state and that is adapted to be pushed out from the ball pin receiver, wherein the pin exerts a force on another end portion of the lever as the connector member is brought into its engaged state.

12. The end fitting device according to claim 11 wherein the end portion of the lever is configured to pull the locking element into its locking position.

13. The end fitting device according to claim 1 wherein the end portion of the lever is configured to push the locking element into its locking position.

14. A gear shift assembly comprising:
a gear shift lever including a first lever arm and a first ball pin arranged on the first lever arm;
a gearbox including a second lever arm and a second ball pin arranged on the second lever arm;
a shift cable interconnecting the gearbox and the gear shift lever for transmitting commands from the gear shift lever to the gearbox, the shift cable including a first end portion attached to the first ball pin and a second end portion attached to the second ball pin, wherein at least one of the first end portion and the second end portion of the shift cable is provided with an end fitting device according to claim 1.

15. The gear shift assembly of claim 14 wherein, for at least one end fitting device, the force bridge interconnects the locking element and the connector member wherein the engaging force is partially transferable to the locking element.

16. The gear shift assembly according to claim 15 wherein, for the at least one end fitting device, the force bridge is adapted to interact with the ball pin or a body upon which the ball pin is arranged.

17. The gear shift assembly of claim 14 wherein, for at least one end fitting device, the force bridge is adapted to interact with the ball pin or a body upon which the ball pin is arranged.

18. The gear shift according to claim 14 wherein, for at least one end fitting device, the locking element is arranged on a same side of the end fitting device as the ball pin entrance opening.

19. An end fitting device for axially adjustable connection of an end portion of a motion transmitting cable to an actuating member, the end fitting device comprising:
a housing having a receiving space adapted for receiving the end portion of the cable via a cable entry;
a connector member comprising a ball pin entrance opening and a ball pin receiver adapted for engaging with a ball pin, wherein an engaged state of the connector member is defined as the ball pin receiver is engaged with a ball pin and a disengaged state of the connector member is defined as the ball pin receiver is not engaged with a ball pin, wherein the connector member further comprises a collar member surrounding the ball pin entrance opening, wherein the collar member is adapted to be arranged in a first position with the connector member is in its disengaged state and in a second position with the connector member is in its engaged state, and wherein the second position is closer to the ball pin receiver than the first position;
a locking element configured to lock an axial position of the cable end portion relative to the housing, wherein the locking element is movable between a non-locking position and a locking position in which the locking element locks the axial position of the cable end portion wherein the cable end portion is immovable axially relative to the housing, wherein the locking element is arranged on a same side of the end fitting device as the ball pin entrance opening; and
a force bridge connected to the locking element, the force bridge configured to displace the locking element from its non-locking position to its locking position in response to an engaging force applied to the end fitting device that brings the connector member into its engaged state, wherein the force bridge partially transfers the engaging force to the locking element.

20. The end fitting device according to claim 19 wherein the force bridge comprises a rigid projecting portion of the collar member, wherein the projecting portion either abuts against, is integrated with, or is fixed to the locking element wherein a translational movement of the collar member towards the ball pin entrance opening is transferred to the locking element by the projecting portion.

\* \* \* \* \*